(12) United States Patent
Kanevsky et al.

(10) Patent No.: US 6,185,378 B1
(45) Date of Patent: Feb. 6, 2001

(54) FILM STORAGE INCLUDING A RECYCLABLE BATTERY

(75) Inventors: Dimitri Kanevsky, Ossining; Wlodek Zadrozny, Tarrytown; Alexander Zlatsin, Yorktown Heights, all of NY (US)

(73) Assignee: International Business Machines Corp., Armonk, NY (US)

( * ) Notice: Under 35 U.S.C. 154(b), the term of this patent shall be extended for 0 days.

(21) Appl. No.: 09/352,104

(22) Filed: Jul. 14, 1999

(51) Int. Cl.[7] .................................................... G03B 17/26
(52) U.S. Cl. ............................................. 396/301; 396/512
(58) Field of Search .................................... 396/301, 511, 396/512, 527, 538, 539

(56) References Cited

U.S. PATENT DOCUMENTS 5,000,396 * 3/1991 Barrella ................................ 396/301
5,862,414 1/1999 Zawodny et al. ........................ 396/6

* cited by examiner

Primary Examiner—W. B. Perkey
(74) Attorney, Agent, or Firm—Louis J. Percello; Fitch, Even, Tabin & Flannery

(57) ABSTRACT

A removable data storage unit for an image capturing device. The data storage unit may be a film storage cylinder and the image capturing device may be a camera. An energy storage source is contained within a plastic film storage cylinder. The battery may be a rechargeable battery. The film storage cylinder includes a pair of electrical contacts, each of the pair being located at opposite ends of the cylinder and connected to a corresponding one of a pair of electrical contacts internally mounted within the film storage cylinder.

19 Claims, 2 Drawing Sheets

FILM STORAGE INCLUDING A RECYCLABLE BATTERY

BACKGROUND OF THE INVENTION

1. Field of the Invention

The present invention is related to cameras and, more particularly, to energy sources for use in cameras.

2. Background Description

Automatic film winding mechanisms in cameras and the like used, for example, in modern photographic equipment are normally battery powered. Batteries for these mechanisms are small, lightweight and expensive. Furthermore, disposing of spent such batteries creates pollution, especially from electrolytes contained therein which may leach into neighboring water sources.

Accordingly there is a need for easily recyclable batteries for film transport mechanisms.

SUMMARY OF THE INVENTION

It is a purpose of the invention to provide easily recyclable batteries for film transport mechanisms.

The present invention is a removable data storage unit, preferably a film storage cylinder, for an image capturing device, preferably a camera. An energy storage source is contained within the film storage cylinder. Preferably the battery is a rechargeable battery. The film storage cylinder includes a pair of electrical contacts, each of the pair being located at opposite ends of the cylinder and connected to a corresponding one of a pair of electrical contacts internally mounted within the film storage cylinder. Preferably, the film storage cylinder is plastic.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
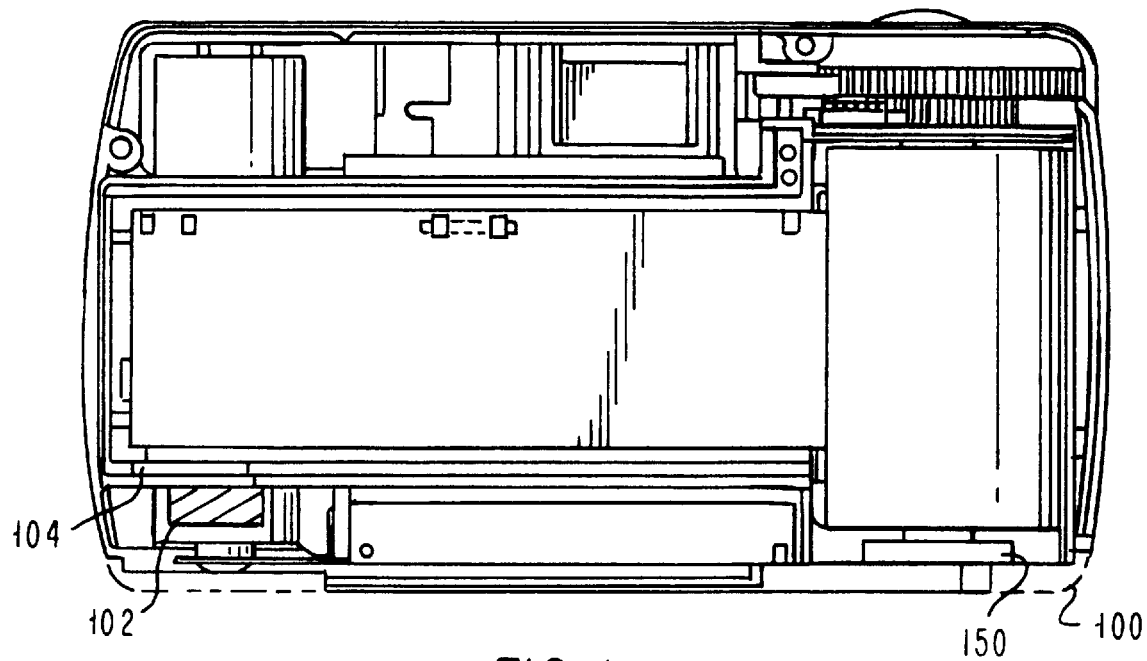
FIG. 1 is a camera including a preferred battery disposed in a film storage cylinder.

Referring now to the drawings and, more particularly, FIG. 1 shows the preferred embodiment of the present invention wherein, for example, a camera 100 includes an energy storage source 102, such as a battery, disposed in a data storage unit 104, e.g., a film storage cylinder, in this example. The enclosed battery 102 has an energy capacity sufficient to run a film transport mechanism (not shown) in the camera such that all shots may be captured on film or other image storage medium on the film storage cylinder 104. When the film storage cylinder 104 is removed for developing, the battery 102 is automatically removed with the film storage cylinder, allowing the battery 102 to be recycled. Preferably, the battery 102 is a rechargeable nickel-cadmium battery, although any appropriate battery with a suitable shelf life and capable of storing sufficient energy to power the film transport mechanism.

Accordingly, with the film storage cylinder 104 in place in the camera 100, the film (not shown) is fed through the camera 100, powered by the battery 102 positioning each frame for exposure. As each frame is exposed, the film transport turns the cylinder 104 to feed the next frame for exposure. After capturing all film shots or, alternately, recording audio and/or video data, the film may be rewound, again powered by the battery 102.

Figure 2A:
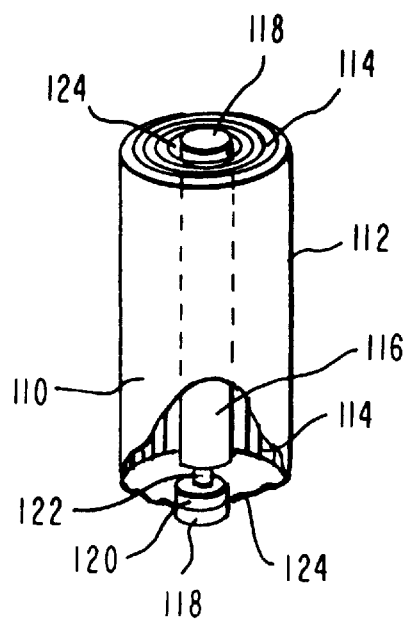
FIGS. 2A, 2B, and 2C are exploded views of the preferred film storage cylinder.
Figure 2B:
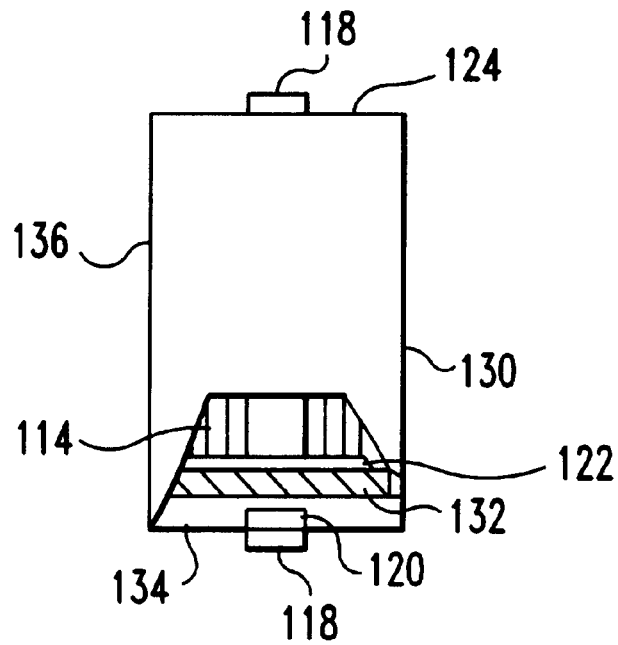
Figure 2C:
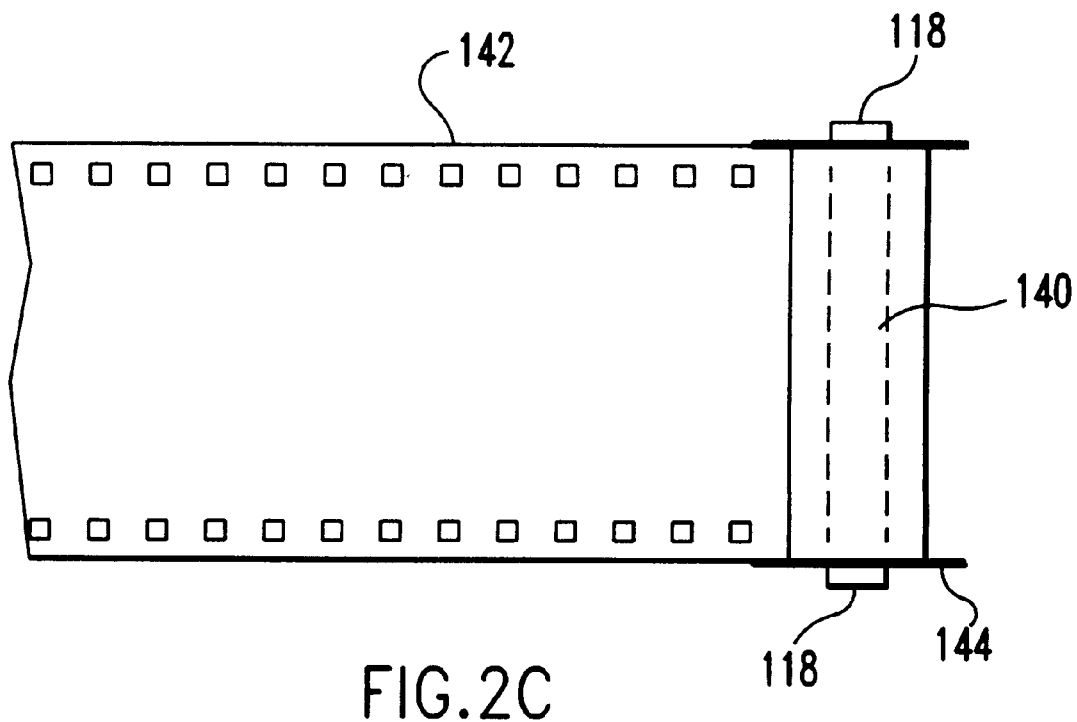

FIGS. 2A–C show views of preferred embodiment the film storage cylinders 104. FIG. 2A is a cutaway view of a first preferred embodiment film storage cylinder 110 or film cassette. In this first embodiment, an outer casing 112 encloses film 114 wound around a cylindrical battery 116 which extends concentrically within the outer casing 112 along the length of the film storage cylinder 110. A pair of external contacts 118 are disposed at opposite ends of the casing 112 for electrically connecting the battery 114 contained therein to the camera 100 in which the film storage cylinder 110 is inserted. Contacts 120 internal to the casing 112 mate with polar terminals 122 on the battery 116. Wire (not shown) passes through cylinder endplates 124 to connect the contacts 120 to the external contacts 118. Alternately the external contacts 118 and internal contacts may be a single piece of conductive material, e.g., steel. The casing 112 may be plastic or of any suitable material. Accordingly the present invention resolves any problems of recycling of batteries.

FIG. 2B shows another preferred embodiment film storage cylinder 130. In this embodiment, a flat battery 132 is disposed at one end 134 of case 136. Like elements are labeled as in FIG. 2A. FIG. 2C shows a third embodiment wherein the battery 140 is encased in the film 142 and integral to the film spindle 144. Again, like elements are labeled as in FIG. 2A.

Furthermore, returning to FIG. 1, additional batteries 150 may be included in the camera 100 separate from the preferred film storage cylinder 104 to provide an energy source for other functions. These other functions may include powering a flash, displaying data on a camera screen when the preferred film storage cylinder 104 is removed, or a an energy source for unrelated camera electronics.

A similar battery/transport media arrangement can be used for other applications such as for other image capturing devices with removable storage systems, e.g., tapes for video camera, audiotapes or digital audio tapes (DAT). Thus, the present invention may be employed in a camera, video camera or tape recorder.

While the invention has been described in terms of preferred embodiments, those skilled in the art will recognize that the invention can be practiced with modification within the spirit and scope of the appended claims.

We claim:

1. A removable data storage unit for an image capturing device comprising:

an image data storage unit;

a compartment within said image data storage unit;

a pair of electrical contacts, said pair being located at opposite ends of said compartment and each extending through an end of said image data storage unit; and a rechargeable energy storage source enclosed in and contained within said compartment between said pair of electrical contacts.

2. A removable data storage unit as in claim 1 wherein said image capturing device is a camera.

3. A removable data storage unit as in claim 2 wherein said rechargeable energy source is a battery.

4. A removable data storage unit as in claim 3 wherein said image data storage unit is a film storage cylinder, said rechargeable battery being disposed within said compartment.

5. A removable data storage unit as in claim 4, wherein when said battery is disposed within said compartment each of said pair of electrical contacts is electrically connected to a corresponding conducting terminal of said battery.

6. A removable data storage unit as in claim 5 wherein said film storage cylinder is plastic.

7. A camera comprising:
   a removable film storage cylinder;
   a roll of film attached at one end to said film storage cylinder;
   a compartment within said film storage cylinder;
   a pair of electrical contacts, said pair being located at opposite ends of said compartment and each extending through an end of said film storage cylinder;
   a film drive unit, said film storage cylinder rotatable attached to said film drive unit; and
   a rechargeable battery disposed within said compartment, the rechargeable battery providing power to said drive unit, said drive unit driving said film storage cylinder.

8. A camera as in claim 7 further comprising:
   at least one other battery providing power to functions within said camera unrelated to driving said film storage cylinder.

9. A camera as in claim 8, said rechargeable battery providing power to advance film on said film storage cylinder, frame by frame and, when all frames have been exposed, to rewind said exposed film onto said film storage cylinder.

10. A camera as in claim 8 wherein, said film storage cylinder is plastic.

11. A removable data storage unit for an recording device comprising:
    a removable data storage unit;
    a compartment within said data storage unit;
    a pair of electrical contacts, said pair being located at opposite ends of said compartment and each extending through an end of said data storage unit; and
    a rechargeable energy storage source enclosed in and contained within said compartment between said pair of electrical contacts.

12. A removable data storage unit as in claim 11, wherein said rechargeable energy source is a rechargeable battery.

13. A removable data storage unit as in claim 12, wherein said data storage unit is a film storage cylinder, said rechargeable battery being disposed within said compartment.

14. A removable data storage unit as in claim 13, wherein when said battery is disposed within said compartment each of said pair of electrical contacts is electrically connected to a corresponding conducting terminal of said battery.

15. A removable data storage unit as in claim 13, wherein said recording device is a camera and said data storage unit is a plastic film storage cylinder.

16. A method of doing business comprising the steps of:
    (a) selling powered film units to customers, said powered film units including photographic film attached to a film storage cylinder, said film storage cylinder including a rechargeable battery contained within a compartment therein;
    b) receiving spent powered film units from customers, photographic film on said spent powered film units including at least one exposed site;
    c) developing exposed sites on received spent powered film units; and
    d) recharging batteries contained within received spent powered film units.

17. A method of doing business as in claim 16 wherein each said battery is recharged without being removed from its said film storage cylinder.

18. A method of doing business as in claim 17, said method further comprising the step of:
    e) attaching unexposed film to film storage cylinders with recharged batteries, said film storage cylinders with attached unexposed film being sold to customers in step (a).

19. A method of doing business as in claim 18, wherein the step (e) of attaching unexposed film further comprises replacing a second battery disposed in a film storage cylinder at one end thereof.

* * * * *